Patented Aug. 17, 1954

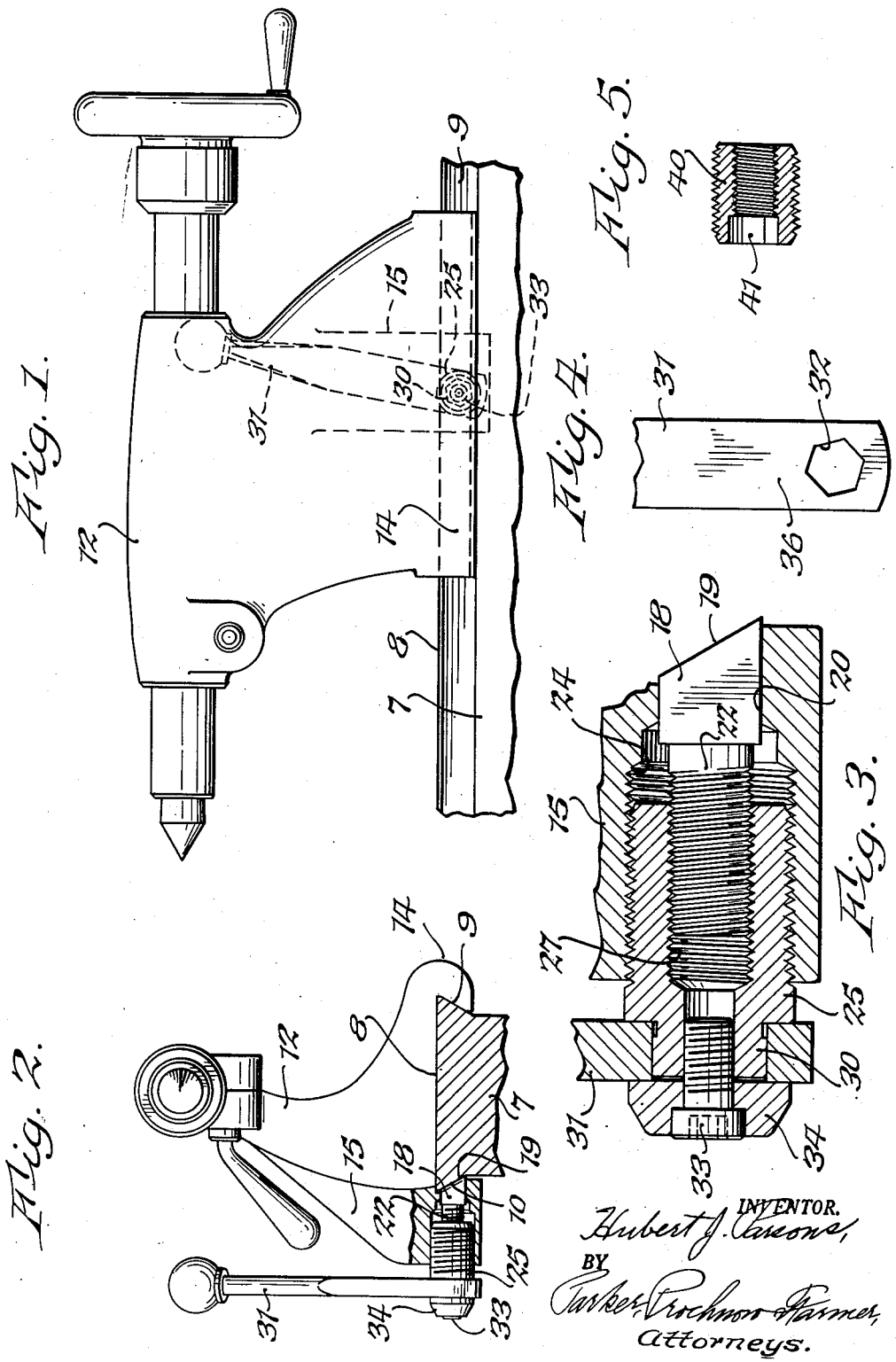

2,686,449

UNITED STATES PATENT OFFICE 2,686,449

MEANS FOR CLAMPING TAILSTOCKS TO LATHE BEDS

Hubert J. Parsons, Elmira, N. Y., assignor to Hardinge Brothers, Inc., Elmira, N. Y.

Application November 27, 1948, Serial No. 62,377

2 Claims. (Cl. 82—31)

This invention relates to improvements in means for securing machine parts, such as a turret, a headstock, tailstock, or the like to the bed of a machine. This invention relates particularly to machines in which the bed is formed with downwardly converging edge portions or of dove-tail shape.

One of the objects of this invention is to provide securing means of improved construction by means of which a machine part may be securely clamped to a bed with a high degree of rigidity and without producing deformations of the bed or machine part.

Another object of this invention is to provide a clamping device of this type which is self-locking so that the machine part will not tend to become loosened or shift during the use of the machine.

It is also an object of this invention to provide a machine part with a locking plug movable accurately into engagement with one of the downwardly converging sides of a bed, which plug is moved into and out of engagement with the bed by means of a double-threaded screw or bolt.

Other objects and advantages will be apparent from the following description of one embodiment of the invention and the novel features will be particularly pointed out hereinafter in connection with the appended claims.

In the accompanying drawing:

Fig. 1 is a side elevation of a portion of a lathe bed having a tailstock secured thereto by means of a clamping device embodying this invention.

Fig. 2 is an end elevation thereof, partly in section.

Fig. 3 is a fragmentary sectional view of the clamping device on an enlarged scale.

Fig. 4 is a fragmentary view of a handle for use with the clamping device.

Fig. 5 is a central, sectional view of a clamping or locking screw of modified construction.

While I have shown in the accompanying drawings by way of example my improved clamping means applied to a tailstock of a lathe, yet it will be obvious that these clamping means may be used in connection with the securing of a headstock or turret to the bed of a lathe, and for securing any machine part to a bed of any other type of machine.

In Figs. 1 and 2, 7 represents the bed of a lathe, that shown including an upper face or bearing surface 8 which is preferably flat and the sides of which terminate in downwardly converging sides 9 and 10. The bed 7 may be part of a lathe or any other machine.

12 represents a machine part to be secured to a lathe which, in the particular construction illustrated, is a tailstock. The base of the tailstock or other machine part is formed to rest on the upper face 8 of the bed and is provided at one side thereof with a downwardly extending part or flange 14 having an inclined face formed to engage with the downwardly diverging side 9 of the bed. The other side of the tailstock or machine part is provided with an outwardly extending part or enlargement 15 which may also constitute a reinforcing rib for the machine part, and the lower portion of which extends downwardly below the upper surface of the bed and below the converging side 10 thereof and forms a housing within which the clamping means for securing the machine part to the bed may be arranged.

The clamping means include a clamping or locking plug 18 which is guided in the extension 15 of the machine part for movement toward and from the bed and is provided with an inclined face 19 which is formed to accurately fit against the downwardly converging side portion 10 of the bed. This plug is preferably square or of other non-circular cross sectional shape and is guided for movement in the extension 15 of the machine part by means of a guide hole or aperture 20 corresponding in shape to the cross sectional shape of the locking or clamping plug 20 so as to permit the plug to slide in the aperture 20 and to prevent turning of the plug. Any other suitable means for guiding the plug in its movement toward and from the adjacent side of the machine bed may be employed.

The plug is provided with a stem or shank portion 22 which may, if desired, be formed integral with the plug, and the greater portion of this shank is exteriorly screw-threaded. This plug is arranged coaxially with a hole 24 formed in the side of the projection 15 and this hole is internally threaded to cooperate with threads formed on the outer surface of a locking screw or bolt 25. This locking screw also has concentric with a screw-threaded periphery thereof a bore 27 which is internally threaded in such a manner as to cooperate with the threads of the stem or shank 22. The threads on the outer portion of the locking screw or bolt are of somewhat greater pitch or, in other words, have fewer threads per inch than the internal threads of the locking screw or bolt and the corresponding external threads of the stem 22, and both sets of threads extend in the same direction so that if right-hand threads are used, all of the threads of the locking screw or bolt are right-hand threads. It will, consequently, be evident that when the screw or bolt is turned to enter the threaded aperture 24, the internal threads of the locking screw will tend to urge the stem 22 and locking plug to the left in Figs. 2 and 3, in other words, away from the bed 7, but because of the differential in the threads, the locking screw or bolt during such revolution thereof will enter the aperture in the machine part to a greater extent than the stem enters the internally threaded bore of the clamping screw. Consequently, the locking or clamping plug 18 will be moved toward the lathe bed when the locking bolt is turned in a direction to enter the threaded hole 24, and at a materially reduced rate so that a strong force is exerted against the locking or clamping plug by turning the screw or bolt and against the side 10 of the bed by the locking plug 18.

The construction described results in a secure locking of a machine part on the bed. The inclined face 19 of the locking plug exerts a force having a component transverse of the bed, which draws the inclined face of flange 14 against the converging side 9 of the bed, and this inclined face of the flange 14, together with the inclined face 19 draw the machine part downwardly against the bearing face 8 of the bed, so that the machine part is securely locked against the bearing face as well as against the downwardly converging sides of the bed. It will be noted also that the force of the plug which draws the machine part against the bearing face of the bed is transferred from the plug directly to the enlargement 15 of the machine part and is not transmitted through the screw or bolt 25.

By means of the construction described, relatively coarse and strong threads may be provided on a locking screw and the stem 22 without a correspondingly large movement of the plug per revolution of the locking screw. The constructing described has the further advantage that when the locking screw is tightened to securely clamp the locking plug against the converging face 10 of the bed, the threads of the locking screw or bolt will become locked so that the machine part will be securely held on the bed without danger of becoming released or shifting, until the locking screw or bolt is turned in the reverse direction to release the clamping plug.

Any suitable or desired means may be employed for turning the locking screw or bolt. If the machine part must frequently be released from the bed, as in the case of a tailstock, the construction illustrated in Figs. 1 to 4 is preferably employed, in which the locking screw or bolt has an integral extension or stud 30 on the outer end thereof. This stud has a hexagonal or other non-circular periphery to which an actuating handle 31 of any suitable or desired form may be attached by providing one end of the handle with an aperture 32 extending through the same into which the stud 30 may fit. The locking screw or bolt 25 may also be provided with a threaded aperture in the outer end thereof into which a bolt or screw 33 may enter. 34 represents a washer which engages a portion of the handle for holding the same on the stud 30 when the screw 33 is tightened. Any other means for securing the handle to the locking screw or bolt may be provided, if desired.

It is generally desirable to arrange the handle in such relation to the machine part which is clamped on the bed that it will be easily and quickly accessible to the operator of the machine so that he can readily grasp the handle to release or tighten the clamping means. For example, the handle may extend upwardly at a slight angle as shown in broken lines in Fig. 1, where it is readily accessible to the operator. As the parts of the clamping device become worn, the tightened or clamping position of the operating handle may vary. In order to maintain the handle when in clamping position within approximately 30 degrees of the position shown in Fig. 1, the aperture 32 in the handle when the stud is of hexagonal cross section is positioned so that the diagonal 36 of the hexagonal hole extends at an angle of about 15 degrees to the length of the handle. Consequently, when the parts become worn to such an extent that the handle slopes considerably more to the left from the position shown in Fig. 1, the handle may be removed from the stud 30 and replaced thereon after being turned about its length so that the face of the handle originally adjacent to the machine part will face away from the machine part. In this manner, the handle may at all times be positioned approximately as desired to suit the convenience of the operator.

When my improved clamping device is applied to a machine part which is to be kept in a fixed location on the bed for a considerable period of time, a locking screw or bolt, such as shown in Fig. 5, may be provided. This locking screw 40 is similar to the locking screw 25 shown in Figs. 1 to 3 except that the outer end thereof, instead of being provided with an outwardly extending stud, may have a non-circular socket or recess 41 formed in the outer end thereof in which a suitable implement may be inserted for turning the locking screw or bolt 40. Any other suitable or desired means for turning the locking screw may be provided.

The construction described has the advantage that when the locking and clamping screw is tightened, it will remain in such tightened position in the same manner as a lock nut. Because of the difference in the pitch of the threads on the exterior and interior of the locking or clamping screw very ample force can be applied to the locking plug 18.

Furthermore, the forces exerted by the locking screw or bolt extend in a direction substantially parallel to the upper surface of the bed so that the forces resulting from the tightening of the locking screw will act in a direction crosswise of the lathe bed and only locally of the lower portion of the machine part which is secured thereto. Consequently, the clamping of the machine part on the bed of the machine will not produce any forces which tend to distort the upper portion of the machine part or to shift the same out of its intended position, so that the clamping device described can be employed on machines operating with a high degree of accuracy.

The construction described has the further important advantage that the locking screw serves not only to apply pressure to the locking plug 18, but also acts on the stem 22 of the plug to hold the same in correct position at all times and to prevent tilting of the plug while in engagement with the bed of the lathe.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. Means for clamping a tailstock on a lathe bed, said lathe bed having an upper flat bearing surface and downwardly converging sides and the tailstock having a fixed portion at one side thereof provided with an inclined face which bears against one of said downwardly converging sides of said bed, an integral reinforcing enlargement extending outwardly and upwardly from the lower portion of the other side of said tailstock, a clamping member on said tailstock movable toward and from the other side of said bed and having an inclined face which engages the other converging side of said bed said clamping member having a non-circular portion, said tailstock having a non-circular guide aperture formed therein in which said non-circular portion of said clamping member is arranged to move toward and from said bed, said enlargement of said tailstock having an internally threaded aperture arranged substantially concentric with said guide aperture, said clamping member having a threaded stem extending axially into said threaded aperture, and a locking screw interposed between said threaded aperture and said stem having an externally threaded part cooperating with the threads of said aperture and an internally threaded part cooperating with said stem, the pitch of the threads of said internally threaded part being less than the pitch of the threads of said externally threaded part, said threads extending in the same direction, said locking screw being rotatable to urge said clamping member into and out of clamping engagement with said other side of said bed, said clamping member in cooperation with said inclined face of said machine part drawing said tailstock against said upper flat bearing face of said bed.

2. In means for clamping a tailstock on a lathe bed having an upper flat bearing surface and downwardly converging sides and in which the tailstock has a fixed portion at one side thereof formed to engage one side of said bed, that improvement which includes a depending portion on said tailstock extending downwardly below said upper surface of said bed at the other side thereof and having an aperture formed therein extending transversely of said bed, said aperture including a non-circular guide portion terminating at one end thereof at said other side of said bed and at the other end in an internally threaded portion, a clamping member including a non-circular locking plug arranged in said guide portion of said aperture and movable therein into and out of contact with the other side of said bed, and a threaded stem integral with said locking plug and extending axially into said internally threaded portion of said aperture and of smaller diameter than said internally threaded portion and having the threads thereon of less pitch than the threads of said aperture, and a locking screw having peripheral threads thereon to engage with the threads of said aperture and having an axially extending aperture therein provided with internal threads formed to engage with the threads of said stem and rotatable to move said clamping member into and out of engagement with said bed, said threads all extending in the same direction, whereby turning of the locking screw advances said locking plug in proportion to the difference in the pitch of the internal and external threads of said locking screw.

References Cited in the file of this patent

UNITED STATES PATENTS

| Number | Name | Date |
|---|---|---|
| 287,160 | Porter | Oct. 23, 1883 |
| 291,971 | Atwood | Jan. 15, 1884 |
| 2,247,562 | Santen | July 1, 1941 |
| 2,400,819 | Gallimore | May 21, 1946 |
| 2,438,235 | Strom | Mar. 23, 1948 |

FOREIGN PATENTS

| Number | Country | Date |
|---|---|---|
| 5,432 | Great Britain | June 27, 1907 |
| 209,697 | Switzerland | July 16, 1940 |